(12) United States Patent
Benoit et al.

(10) Patent No.: US 10,712,486 B2
(45) Date of Patent: Jul. 14, 2020

(54) OPTICAL STACK HAVING REFLECTIVE POLARIZER WITH POLYMERIC LAYERS AND SPECIFIED REFLECTANCE AND TRANSMITTANCE

(71) Applicant: 3M INNOVATIVE PROPERTIES COMPANY, St. Paul, MN (US)

(72) Inventors: Gilles J. Benoit, Minneapolis, MN (US); Timothy J. Nevitt, Red Wing, MN (US); Matthew B. Johnson, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/338,943

(22) PCT Filed: Nov. 21, 2017

(86) PCT No.: PCT/US2017/062735
§ 371 (c)(1),
(2) Date: Apr. 2, 2019

(87) PCT Pub. No.: WO2018/102193
PCT Pub. Date: Jun. 7, 2018

(65) Prior Publication Data
US 2019/0339433 A1  Nov. 7, 2019

Related U.S. Application Data

(60) Provisional application No. 62/427,450, filed on Nov. 29, 2016.

(51) Int. Cl.
*G02B 5/30* (2006.01)
(52) U.S. Cl.
CPC ........... *G02B 5/305* (2013.01); *G02B 5/3066* (2013.01); *G02B 5/3041* (2013.01)

(58) Field of Classification Search
CPC .. G02B 5/3025; G02B 5/3033; G02B 5/3041; G02B 5/305; G02B 5/3058; G02B 5/3066
(Continued)

(56) References Cited

U.S. PATENT DOCUMENTS 3,610,729 A    10/1971 Rogers
4,446,305 A     5/1984 Rogers et al.
(Continued)

FOREIGN PATENT DOCUMENTS

JP    2009-037235    2/2009
KR    2011-0055471   5/2011
(Continued)

OTHER PUBLICATIONS

International Search Report for PCT International Application No. PCT/US2017/062735 dated Feb. 9, 2018, 4 pages.

*Primary Examiner* — Ryan S Dunning
(74) *Attorney, Agent, or Firm* — Clifton F. Richardson (57) ABSTRACT

Optical stacks including a first reflective polarizer and a partially reflective component are described. The partially reflective component may be a second reflective polarizer or a collimating reflector. The first reflective polarizer has a first average visible light reflectance for light polarized along the first block axis at normal incidence of at least 90 percent and a first average visible light transmittance for light polarized along the first pass axis at normal incidence of at least 85 percent. The second reflective polarizer has a second block axis and a second average visible light reflectance for light polarized along the second block axis at normal incidence being no more than the first average visible light reflectance minus 10 percent. The first and second block axes are not parallel and the first and second reflective polarizers have different f-ratios.

20 Claims, 5 Drawing Sheets

(58) Field of Classification Search
USPC ............ 359/485.01, 485.02, 485.03, 485.04, 359/485.05
See application file for complete search history.

(56) References Cited

U.S. PATENT DOCUMENTS

| | | |
|---|---|---|
| 5,486,949 A | 1/1996 | Schrenk et al. |
| 5,882,774 A | 3/1999 | Jonza et al. |
| 6,179,948 B1 | 1/2001 | Merrill et al. |
| 6,783,349 B2 | 8/2004 | Neavin et al. |
| 6,975,455 B1 | 12/2005 | Kotchick et al. |
| 7,826,009 B2 | 11/2010 | Weber et al. |
| 8,469,575 B2 | 6/2013 | Weber et al. |
| 2010/0254002 A1 | 10/2010 | Merrill et al. |
| 2011/0272849 A1 | 11/2011 | Neavin et al. |
| 2011/0286095 A1 | 11/2011 | Merrill et al. |
| 2014/0139787 A1 | 5/2014 | Ki et al. |
| 2014/0268346 A1 | 9/2014 | Weber et al. |
| 2015/0378077 A1 | 12/2015 | Haag et al. |
| 2016/0109628 A1 | 4/2016 | Weber et al. |
| 2017/0068030 A1 | 3/2017 | Ambur et al. |

FOREIGN PATENT DOCUMENTS

| | | |
|---|---|---|
| KR | 2016-0055173 | 5/2016 |
| WO | WO 2015-102961 | 7/2015 |
| WO | WO 2016-037777 | 9/2016 |

OPTICAL STACK HAVING REFLECTIVE POLARIZER WITH POLYMERIC LAYERS AND SPECIFIED REFLECTANCE AND TRANSMITTANCE

BACKGROUND

Multilayer optical films are known. Such films can incorporate a large number of thin layers of different light transmissive materials, the layers being referred to as microlayers because they are thin enough so that the reflection and transmission characteristics of the optical film are determined in large part by constructive and destructive interference of light reflected from the layer interfaces. Depending on the amount of birefringence (if any) exhibited by the individual microlayers, and the relative refractive index differences for adjacent microlayers, and also on other design characteristics, the multilayer optical films can be made to have reflection and transmission properties that may be characterized as a reflective polarizer in some cases, and as a mirror in other cases, for example.

Reflective polarizers composed of a plurality of microlayers whose in-plane refractive indices are selected to provide a substantial refractive index mismatch between adjacent microlayers along an in-plane block axis and a substantial refractive index match between adjacent microlayers along an in-plane pass axis, with a sufficient number of layers to ensure high reflectivity for normally incident light polarized along one principal direction, referred to as the block axis, while maintaining low reflectivity and high transmission for normally incident light polarized along an orthogonal principal direction, referred to as the pass axis, have been known for some time. See, e.g., U.S. Pat. No. 3,610,729 (Rogers), U.S. Pat. No. 4,446,305 (Rogers et al.), and U.S. Pat. No. 5,486,949 (Schrenk et al.).

SUMMARY

In some aspects of the present description, an optical stack including a first reflective polarizer and an additional partially reflective component disposed proximate the first reflective polarizer is provided. In some embodiments, the additional partially reflective component is a second reflective polarizer. In some embodiments, the additional partially reflective component is a collimating reflector.

In some aspects of the present description, an optical stack including a first reflective polarizer and a second reflective polarizer disposed proximate the first reflective polarizer is provided. The first reflective polarizer has a first pass axis and an orthogonal first block axis and includes a first plurality of alternating polymeric layers having a first f-ratio. The first reflective polarizer has a first average visible light reflectance for light polarized along the first block axis at normal incidence of at least 90 percent and a first average visible light transmittance for light polarized along the first pass axis at normal incidence of at least 85 percent. The second reflective polarizer has a second pass axis and an orthogonal second block axis and includes a second plurality of alternating polymeric layers having a second f-ratio. The second reflective polarizer has a second average visible light reflectance for light polarized along the second block axis at normal incidence, where the second average visible light reflectance is no more than the first average visible light reflectance minus 10 percent. The second f-ratio is different from the first f-ratio and the second pass axis is not parallel to the first pass axis.

In some aspects of the present description, an optical stack including a first reflective polarizer and a collimating reflector disposed proximate the first reflective polarizer is provided. The first reflective polarizer has a first pass axis and an orthogonal first block axis and includes a first plurality of alternating polymeric layers having a first f-ratio. The first reflective polarizer has a first average visible light reflectance for light polarized along the first block axis at normal incidence of at least 90 percent and a first average visible light transmittance for light polarized along the first pass axis at normal incidence of at least 85 percent. The collimating reflector includes a second plurality of alternating polymeric layers and has a second average visible reflectance for unpolarized light at normal incidence in a range of 20 percent to 80 percent.

DETAILED DESCRIPTION

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to the present description, it has been found that optical stacks including a first reflective polarizer and an additional partially reflective component are useful in a variety of optical applications, such as display applications. In particular, in some embodiments, the reflection properties of the additional partially reflective component (e.g., reflectance for unpolarized light, reflectance along a block axis, and/or orientation of a low transmission axis (e.g., block axis) of the partially reflective component relative to a block axis of the first reflective polarizer) can be adjusted to provide overall desired reflection and/or transmission properties of the optical stack. The partially reflective component may be a second reflective polarizer that is weaker than the first reflective polarizer, or the partially reflective component may be a collimating reflector, for example. In some embodiments, the optical stacks are useful in display applications and can provide a light output with improved color properties (e.g., reduced colorations at high view angles compared to a comparative display utilizing a conventional partial reflective polarizer instead of the optical stack).

In some embodiments, the first reflective polarizer has a first pass axis and an orthogonal first block axis and has a first average visible light reflectance for light polarized along the first block axis at normal incidence of at least 90 percent and a first average visible light transmittance for light polarized along the first pass axis at normal incidence of at least 85 percent. In some embodiments, the partially reflective component is a second reflective polarizer having a second pass axis, which is not parallel to the first pass axis, and an orthogonal second block axis. The second reflective polarizer has a second average visible light reflectance for light polarized along the second block axis at normal incidence being no more than 50 percent and/or being no more than the first average visible light reflectance minus 10 percent, or minus 20 percent, or minus 30 percent. In some embodiments, the second reflective polarizer has a second average visible light transmittance of at least 85 percent for light polarized along the second pass axis at normal incidence. In some embodiments, the partially reflective component is a collimating reflector (i.e., a reflector having a transmittance at a first lower angle of incidence higher than a transmittance at a second higher angle of incidence) having a second average visible reflectance for unpolarized light at normal incidence in a range of 20 percent to 80 percent. In some embodiments, this second average visible reflectance for unpolarized light at normal incidence is no more than 50 percent and/or is no more than the first average visible light reflectance of the first reflective polarizer for light polarized along the second block axis at normal incidence minus 10 percent, or minus 20 percent, or minus 30 percent.

As used herein, transmittance and reflectance values for a film, layer, or component (e.g., a polarizer or a reflector) refers to the transmittance and reflectance values determined with air interface present at the major surfaces of the film, layer, or component, unless specified differently. The average visible light transmittance and reflectance refers to an unweighted average over wavelengths in the range of 400 nm to 700 nm, unless specified differently. A particular polarization may be specified or unpolarized light may be specified for the average visible light transmittance or reflectance. An incidence angle, which refers to an angle between a light ray and a normal to the surface, may also be specified. The first reflective polarizer and the additional partially reflective component may be multilayer optical films that provide desired reflectance due to differing refractive indices in alternating polymeric layers. Refractive index refers to the refractive index determined at a wavelength of 550 nm unless specified differently. The optical stacks of the present description may include one or more components (e.g., absorbing polarizer and/or quarter-wave retarder or other retarder) in addition to the first reflective polarizer and the partially reflective component.

Figure 1A:
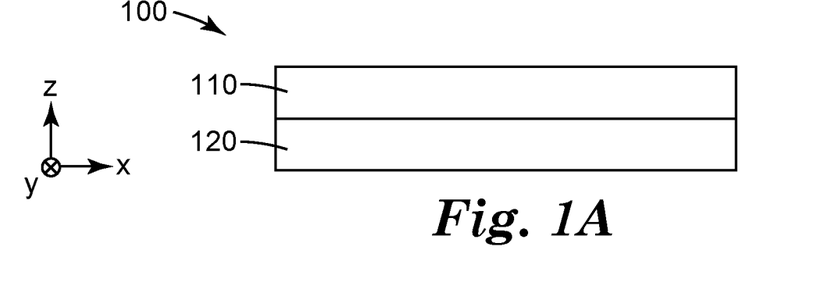
FIG. 1A is a schematic cross-sectional view of an optical stack.

FIG. 1A is a schematic cross-sectional view of optical stack 100 which includes first reflective polarizer 110 and partially reflective component 120. In some embodiments, partially reflective component 120 is a second reflective polarizer. In some embodiments, the second reflective polarizer is a collimating reflective polarizer as described further elsewhere herein. In some embodiments, partially reflective component 120 is a collimating reflector. In some embodiments, the collimating reflector is an asymmetric reflector, as described further elsewhere herein, and/or a second reflective polarizer.

Figure 1B:
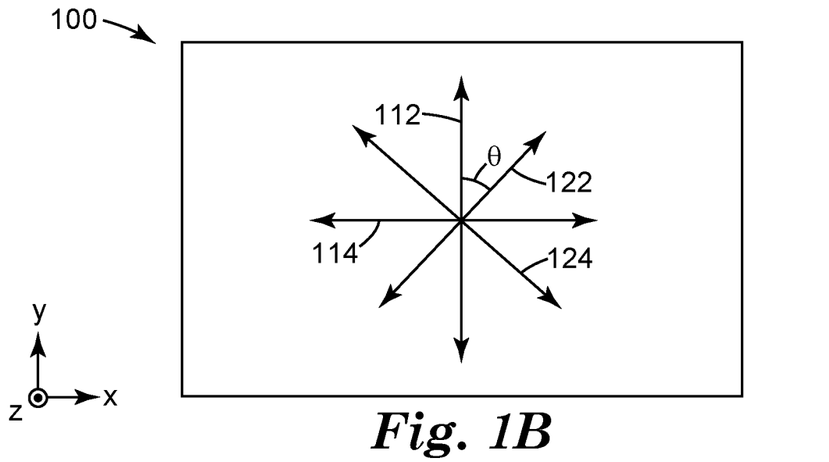
FIG. 1B is a schematic top view of the optical stack of FIG. 1A.

The first polarizer has a first pass axis and an orthogonal first block axis. In embodiments where partially reflective component 120 is a second reflective polarizer, the second reflective polarizer has a second pass axis and an orthogonal second block axis. The optical stack 100 has a thickness in the z-direction and extends generally in the x- and y-directions. The pass and block axes are axes in the x-y plane. FIG. 1B is a schematic top view of the optical stack 100 showing the first pass axis 112 and the first block axis 114 of the first reflective polarizer 110 and showing the second pass axis 122 and the second block axis 124 of the second reflective polarizer. An angle θ between the first and second pass axes 112 and 122 is shown. The angle θ between the first and second pass axes 112 and 122 may be in a range of 10 to 90 degrees, or in a range of 45 to 90 degrees, or in a range of 60 to 90 degrees, or in a range of 80 to 90 degrees, for example. The range selected for the angle θ may depend on the intended application and may depend on the relative strength of the second reflective polarizer. The strength of the second reflective polarizer may be characterized by the average visible light reflectance of light at normal incidence polarized along the block axis. In applications where a lower transmission through the optical stack is desired, an angle θ closer to 90 degrees may be selected.

Figure 2A:
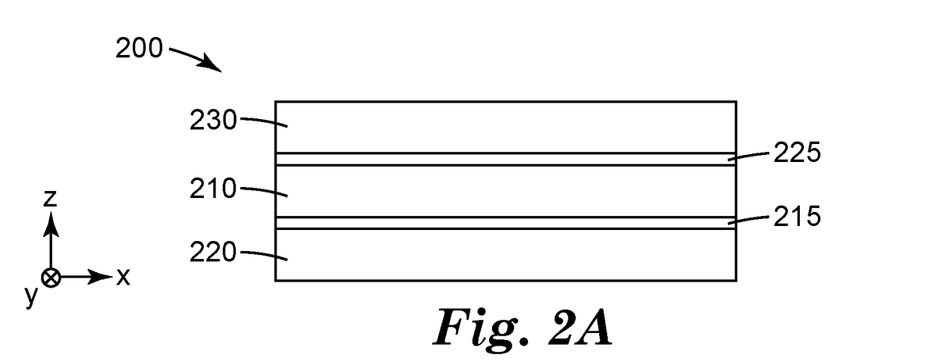
FIG. 2A is a schematic cross-sectional view of an optical stack.
Figure 2B:
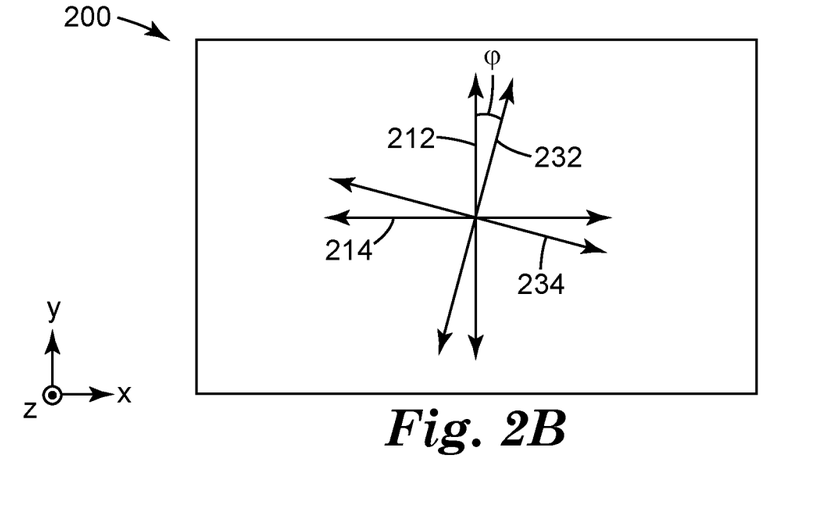
FIG. 2B is a schematic top view of the optical stack of FIG. 2A.

In some embodiments, a third optical layer, such as an absorbing polarizer, is included in the optical stack. FIG. 3A is a schematic cross-sectional view of optical stack 200 including first reflective polarizer 210, partially reflective component 220 and absorbing polarizer 230. First reflective polarizer 210 may correspond to first reflective polarizer 110 and partially reflective component 220 may correspond to partially reflective component 120. Partially reflective component 220 may be a second reflective polarizer and/or a collimating reflector as described further elsewhere herein. In the illustrated embodiment, the first reflective polarizer 210 and the partially reflective component 220 are attached through optional optically clear adhesive 215 and the first reflective polarizer and the absorbing polarizer 230 are attached through optional optically clear adhesive 225. In other embodiments, one or both of the optically clear adhesives 215 and 225 are omitted. The first reflective polarizer 210 and the partially reflective component 220 may have respective first and second pass and block axes as described for optical stack 100. Absorbing polarizer 230 may have third pass and block axes with the third pass axis aligned with the first pass axis of the first reflective polarizer 210. FIG. 2B is a schematic top view of the optical stack 200 showing the first pass axis 212 and the first block axis 214 of the first reflective polarizer 210 and showing the third pass axis 232 and the third block axis 234 of the absorbing polarizer 230. An angle φ between the first and third pass axes 212 and 232 is shown. In some embodiments, the third pass axis 232 is aligned with the first pass axis 212 so that the angle φ between the first and third pass axes 212 and 232 is less than 10 degrees or less than 5 degrees.

A reflector which reflects more strongly for light polarized along one axis than for light polarized along an orthogonal axis may be referred to as an asymmetric reflector. For example, an asymmetric reflector may have a reflectance for light polarized along one axis at normal incidence higher than a reflectance for light polarized along an orthogonal axis at normal incidence by at least 5 percent, or at least 10 percent, or at least 20 percent, or at least 50 percent. An example of an asymmetric reflector is a reflective polarizer. Another example is a three-quarter polarizer which reflects about half of normal incident light polarized along the pass axis as well as most of normal incidence light polarized along the block axis. A reflective polarizer may be described as an asymmetric reflector that has a high transmittance (e.g., an average visible light transmittance of at least 80 percent, or at least 85 percent, or at least 86 percent) for light polarized along a pass axis and incident on the reflective polarizer at normal incidence. A reflective polarizer may also have a high reflectance (e.g., an average visible light reflectance of at least 80 percent, or at least 85 percent, or at least 90 percent, or at least 95 percent) for light polarized along a block axis and incident on the reflective polarizer at normal incidence. In some cases, a reflective polarizer may be a weak polarizer having a lower reflectance along the block axis (e.g., an average visible light reflectance of at least 10 percent, or at least 20 percent, or at least 25 percent but less than 85 percent, or less than 75 percent or less than 60 percent for light polarized along the block axis and incident on the reflective polarizer at normal incidence). In some cases, a collimating reflector may be an asymmetric reflector and may have a higher reflectance for light at normal incidence polarized along a first axis than for light at normal incidence polarized along an orthogonal second axis. In some cases, a collimating reflector may have a reflectance for light at normal incidence polarized along a first axis that is equal to or substantially equal (e.g., less than 5 percent difference or less than 2 percent difference) to a reflectance for light at normal incidence polarized along an orthogonal second axis.

Figure 3:
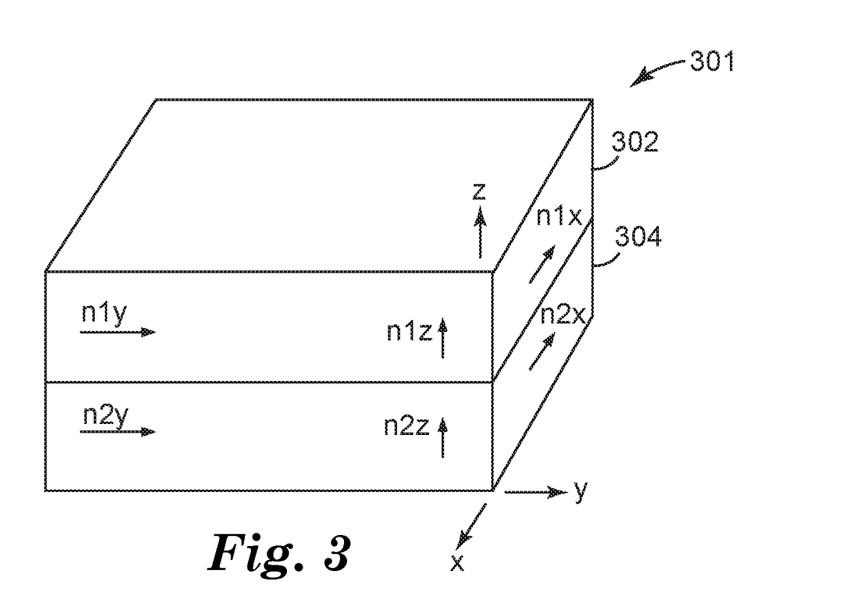
FIG. 3 is a schematic perspective view of an optical repeat unit.

In some embodiments, the first reflective polarizer includes a first plurality of alternating polymeric layers, and in some embodiments, the partially reflective component includes a second plurality of alternating layers. An immediately adjacent pair of polymeric layers in a stack of alternating polymeric layers may be referred to as an optical repeat unit (ORU) of a multilayer optical film. FIG. 3 is a schematic perspective view of an exemplary optical repeat unit of multilayer optical film 301. FIG. 3 depicts only two layers of the multilayer optical film 301, which can include tens or hundreds of such layers arranged in one or more contiguous packets or stacks. The film 301 includes individual microlayers 302, 304, where "microlayers" refer to layers that are sufficiently thin so that light reflected at a plurality of interfaces between such layers undergoes constructive or destructive interference to give the multilayer optical film the desired reflective or transmissive properties. The microlayers 302, 304 can together represent one optical repeat unit (ORU) of the multilayer stack, an ORU being the smallest set of layers that recur in a repeating pattern throughout the thickness of the stack. The microlayers have different refractive index characteristics so that some light is reflected at interfaces between adjacent microlayers. For optical films designed to reflect light at ultraviolet, visible, or near-infrared wavelengths, each microlayer typically has an optical thickness (i.e., a physical thickness multiplied by refractive index) of less than about 1 micrometer. Thicker layers can, however, also be included, such as skin layers at the outer surfaces of the film, or protective boundary layers (PBL) disposed within the film that separate packets of microlayers, as desired.

Refractive indices of one of the microlayers (e.g. layer 302 of FIG. 3, or the "A" layers of FIG. 4 below) for light polarized along principal x-, y-, and z-axes are n1x, n1y, and n1z, respectively. The mutually orthogonal x-, y-, and z-axes can, for example, correspond to the principal directions of the dielectric tensor of the material. In many embodiments, and for discussion purposes, the principle directions of the different materials are coincident, but this need not be the case in general. The refractive indices of the adjacent microlayer (e.g. layer 304 in FIG. 3, or the "B" layers in FIG. 4) along the same axes are n2x, n2y, n2z, respectively. The differences in refractive index between these layers are $\Delta nx$ ($=n1x-n2x$) along the x-direction, $\Delta ny$ ($=n1y-n2y$) along the y-direction, and $\Delta nz$ ($=n1z-n2z$) along the z-direction. The nature of these refractive index differences, in combination with the number of microlayers in the film (or in a given stack of the film) and their thickness distribution, control the reflective and transmissive characteristics of the film (or of the given stack of the film). For example, if adjacent microlayers have a large refractive index mismatch along one in-plane direction ($\Delta nx$ large) and a small refractive index mismatch along the orthogonal in-plane direction ($\Delta ny \approx 0$), the film or packet may behave as a reflective polarizer for normally incident light.

If desired, the refractive index difference ($\Delta nz$) between adjacent microlayers for light polarized along the z-axis can also be tailored to achieve desirable reflectivity properties for the p-polarization component of obliquely incident light. For ease of explanation, at any point of interest on a multilayer optical film the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1,2 are chosen so that $n_{1x} \geq n_{2x}$, i.e., $\Delta n_x \geq 0$.

To maintain near on-axis reflectivity of p-polarized light at oblique angles of incidence, the z-index mismatch $\Delta nz$ between microlayers can be controlled to be substantially less than the maximum in-plane refractive index difference $\Delta n_x$, such that $\Delta nz \leq 0.5 * \Delta n_x$. Alternatively, $\Delta nz \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta nz$ can be controlled to have the opposite polarity compared to the in-plane index difference $\Delta n_x$, i.e., $\Delta nz < 0$. This condition yields interfaces whose reflectivity for p-polarized light increases with increasing angles of incidence, as is the case for s-polarized light. If $\Delta nz > 0$, then the reflectivity for p-polarized light decreases with angle of incidence. The foregoing relationships also apply to relationships involving $\Delta nz$ and $\Delta ny$, e.g., in cases where significant reflectivity and transmission are desired along two principal in-plane axes (such as a balanced or symmetric partially reflecting mirror film, or a partial polarizing film whose pass axis has significant reflectivity at normal incidence).

Figure 4:
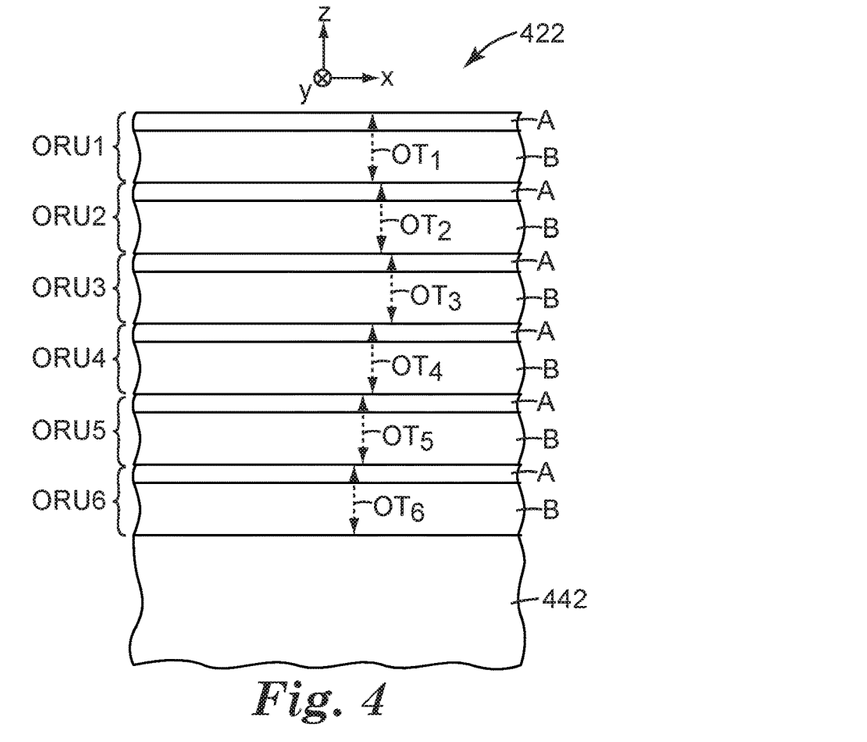
FIG. 4 is a schematic cross-sectional view of a multilayer optical film.

In the schematic side view of FIG. 4, more interior layers of a multilayer film 422 are shown so that multiple ORUs can be seen. The film is shown in relation to a local x-y-z Cartesian coordinate system, where the film extends parallel to the x- and y-axes, and the z-axis is perpendicular to the film and its constituent layers and parallel to a thickness axis of the film.

In FIG. 4, the microlayers are labeled "A" or "B," the "A" layers being composed of one material and the "B" layers being composed of a different material, these layers being stacked in an alternating arrangement to form optical repeat units or unit cells ORU 1, ORU 2, . . . ORU 6 as shown. In many embodiments, a multilayer optical film composed entirely of polymeric materials would include many more than 6 optical repeat units if high reflectivities are desired.

The multilayer optical film 422 is shown as having a substantially thicker layer 442, which may represent an outer skin layer, or a protective boundary layer ("PBL," see U.S. Pat. No. 6,783,349 (Neavin et al.)) that separates the stack of microlayers shown in the figure from another stack or packet of microlayers (not shown).

In some cases, the microlayers can have thicknesses and refractive index values corresponding to a ¼-wave stack, i.e., arranged in ORUs each having two adjacent microlayers of equal optical thickness (f-ratio=0.5, the f-ratio being the ratio of the optical thickness of a constituent layer "A" to the optical thickness of the complete optical repeat unit, where the constituent layer "A" is assumed to have a higher refractive index than the constituent layer "B"—if the layer "B" has the higher refractive index, then the f-ratio is the ratio of the optical thickness of the constituent layer "B" to the optical thickness of the complete optical repeat unit), such ORU being effective to reflect by constructive interference light whose wavelength $\lambda$ is twice the overall optical thickness of the optical repeat unit, where the "optical thickness" of a body refers to its physical thickness multiplied by its refractive index. For a reflective polarizer, the refractive index used to determine the f-ratio is the refractive index along the block axis. For an asymmetric reflector, the refractive index used to determine the f-ratio is the refractive index along the axis giving the highest on-axis reflectivity. The use of an f-ratio of 0.5 is often desirable for a strong mirror or polarizer because it maximizes the reflective power of the 1st order reflection band of a stack of microlayers.

In some embodiments, the first reflective polarizer of an optical stack of the present description includes a first plurality of alternating polymeric layers having a first f-ratio and in some embodiments, the partially reflective component (e.g., second reflective polarizer or collimating reflector) includes a second plurality of alternating polymeric layers having a second f-ratio. In some embodiments, the first f-ratio is close to 0.5. For example, the first f-ratio may be in a range of 0.4 to 0.6, or in a range of 0.45 to 0.55. In some embodiments, the second f-ratio is further from 0.5 than the first f-ratio. For example, in some embodiments, the second f-ratio is less than 0.2, or less than 0.15, and in some embodiments, the second f-ratio is greater than 0.8, or greater than 0.85. A low (or high) f-ratio can be used to reduce the reflectance of the partially reflective component. It has been found that using an f-ratio near 0.5 for the first reflective polarizer and using an f-ratio less than 0.2 or greater than 0.8 for the second polarizer or the collimating reflector provides a high light output with improved color (e.g., a lower color or white light output at higher viewing angles) when the optical stack is used as a front reflector in a recycling backlight of a liquid crystal display, for example, compared to using a conventional partial reflective polarizer as the front reflector. This is due, at least in part, to manufacturing variations in conventional partial reflective polarizers which can result in undesired off-axis colors. In some cases, partial reflective polarizers, such as three-quarter polarizers which reflect about half of normal incident light polarized along the pass axis as well as most of normal incidence light polarized along the block axis, are multilayer optical films that include a plurality of optical repeat units with a refractive index difference between layers in an optical repeat unit, and/or a number of the optical repeat units, and/or f-ratio of the optical repeat units chosen to give the desired reflectance and transmittance properties. Such partial reflective polarizers can be used in recycling backlights to increase the recycling which, in turn, can improve uniformity and/or brightness. However, when a multilayer optical film is selected to give partial transmission and partial refection for light polarized along a pass axis, cross-web variations in thickness, for example, can lead to optical artifacts, such as off-axis color, that do not arise in reflective polarizers that provide a high transmission for light polarized along the pass axis. The optical stacks of the present description can be used to provide a similar uniformity and/or brightness benefit as conventional partial reflective polarizers, but with the off-axis color variations that can arise in conventional partial reflective polarizer due to manufacturing variations, for example, significantly reduced or eliminated.

In exemplary embodiments, the optical thicknesses of the ORUs differ according to a thickness gradient along the z-axis or thickness direction of the film, whereby the optical thickness of the optical repeat units increases, decreases, or follows some other functional relationship as one progresses from one side of the stack (e.g., the top) to the other side of the stack (e.g., the bottom). Such thickness gradients can be used to provide a widened reflection band to provide substantially spectrally flat transmission and reflection of light over the extended wavelength band of interest, and also over all angles of interest. Alternatively, the layer thickness gradient of the disclosed packets of microlayers may be deliberately tailored to provide reflection and transmission spectra that change significantly over the wavelength range of interest. For example, it may be desirable for the multilayer optical film body to transmit (or reflect) more blue light than red light, or vice versa, or to transmit (or reflect) more green light than blue light and red light. Although such desired spectral non-uniformities may cause the multilayer optical film body to exhibit a colored (non-clear or non-neutral) appearance, this desired color is often distinguishable from the color that may be considered undesired in that the desired color is associated with relatively slow changes in the spectral reflection or transmission, whereas the undesired color is associated with faster changes in those parameters as a function of wavelength. For example, spectral non-uniformities in reflection or transmission associated with desired color may vary as a function of wavelength with characteristic periods of about 100 nm or greater, whereas spectral non-uniformities in reflection or transmission associated with undesired color may vary as a function of wavelength with characteristic periods of less than about 50 nm, although this number depends somewhat on the magnitude of localized disruptions in the layer thickness profile.

The first reflective polarizer may include ORUs at one side of the polarizer adapted to reflect blue or shorter wavelengths and ORUS at the opposite side of the polarizer adapted to reflect red or longer wavelengths. Similarly, the partially reflective component may include ORUs at one side of the polarizer adapted to reflect blue or shorter wavelengths and ORUS at the opposite side of the polarizer adapted to reflect red or longer wavelengths. The first reflective polarizer and the partially reflective component may be oriented in any way relative to each other. For example, the ORUs of the first reflective polarizer that are adapted to reflect blue light may face the ORUs of the partially reflective component that are adapted to reflect blue light or the ORUs of the partially reflective component that are adapted to reflect red light. Similarly, the ORUs of the first reflective polarizer that are adapted to reflect red light may face the ORUs of the partially reflective component that are adapted to reflect blue light or the ORUs of the partially reflective component that are adapted to reflect red light.

To achieve reflectivity with a reasonable number of layers, adjacent microlayers may exhibit a difference in refractive index (Δnx) for light polarized along the x-axis of at least 0.03, for example. If high reflectivity is desired for two orthogonal polarizations, then the adjacent microlayers also may exhibit a difference in refractive index (Δny) for light polarized along the y-axis of at least 0.03, for example. In some cases, adjacent microlayers may have refractive index mismatches along the two principal in-plane axes (Δnx and Δny) that are close in magnitude, in which case the film or packet may behave as an on-axis mirror or partial mirror. Alternatively, for reflective polarizers that are designed to be partially reflective for the pass axis polarization, adjacent microlayers may exhibit a large difference in refractive index (Δnx) for light polarized along the x-axis and a smaller but still substantial difference in refractive index (Δny) for light polarized along the y-axis. In variations of such embodiments, the adjacent microlayers may exhibit a refractive index match or mismatch along the z-axis (Δnz=0 or Δnz large), and the mismatch may be of the same or opposite polarity or sign as the in-plane refractive index mismatch(es). Such tailoring of Δnz plays a key role in whether the reflectivity of the p-polarized component of obliquely incident light increases, decreases, or remains the same with increasing incidence angle. For example, tailoring of Δnz can be utilized to make a reflector that provides a collimating effect when included in a recycling backlight, for example. Collimating multilayer optical films are described further in U.S. Pat. Appl. Pub. No. 2014/0268346 (Weber et al.) which is hereby incorporated herein by reference to the extent that it does not contradict the present description. Collimating reflective polarizers and optical films including the collimating reflective polarizers are described further in PCT Publication WO 2015/102961 (Shin) which is hereby incorporated herein by reference to the extent that it does not contradict the present description.

Exemplary multilayer optical films are composed of polymer materials and may be fabricated using coextruding, casting, and orienting processes. Reference is made to U.S. Pat. No. 5,882,774 (Jonza et al.) "Optical Film", U.S. Pat. No. 6,179,948 (Merrill et al.) "Optical Film and Process for Manufacture Thereof", U.S. Pat. No. 6,783,349 (Neavin et al.) "Apparatus for Making Multilayer Optical Films", and patent application publication US 2011/0272849 (Neavin et al.) "Feedblock for Manufacturing Multilayer Polymeric Films". The multilayer optical film may be formed by coextrusion of the polymers as described in any of the aforementioned references. The polymers of the various layers may be chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

In brief summary, the fabrication method can include: (a) providing at least a first and a second stream of resin corresponding to the first and second polymers to be used in the finished film; (b) dividing the first and the second streams into a plurality of layers using a suitable feedblock, such as one that includes: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic. A multilayer optical film with controlled low frequency variations in reflectivity and transmission over a wide wavelength range can be achieved by the thermal zone control of the axial rod heater, see e.g., U.S. Pat. No. 6,783,349 (Neavin et al.). In some cases, the fabrication equipment may employ one or more layer multipliers to multiply the number of layers in the finished film. In other embodiments, the films can be manufactured without the use of any layer multipliers.

In reference to traditional polarizing films, light can be considered to be polarized in two orthogonal planes, where the electric field vector of the light, which is transverse to the propagation of the light, lies within a particular plane of polarization. In turn, the polarization state of a given light ray can be resolved into two different polarization states: p-polarized (p-pol) and s-polarized (s-pol) light. P-pol light is polarized in the plane of incidence of the light ray and a given surface, where the plane of incidence is a plane containing both the local surface normal vector and the light ray propagation direction or vector.

Figure 5:
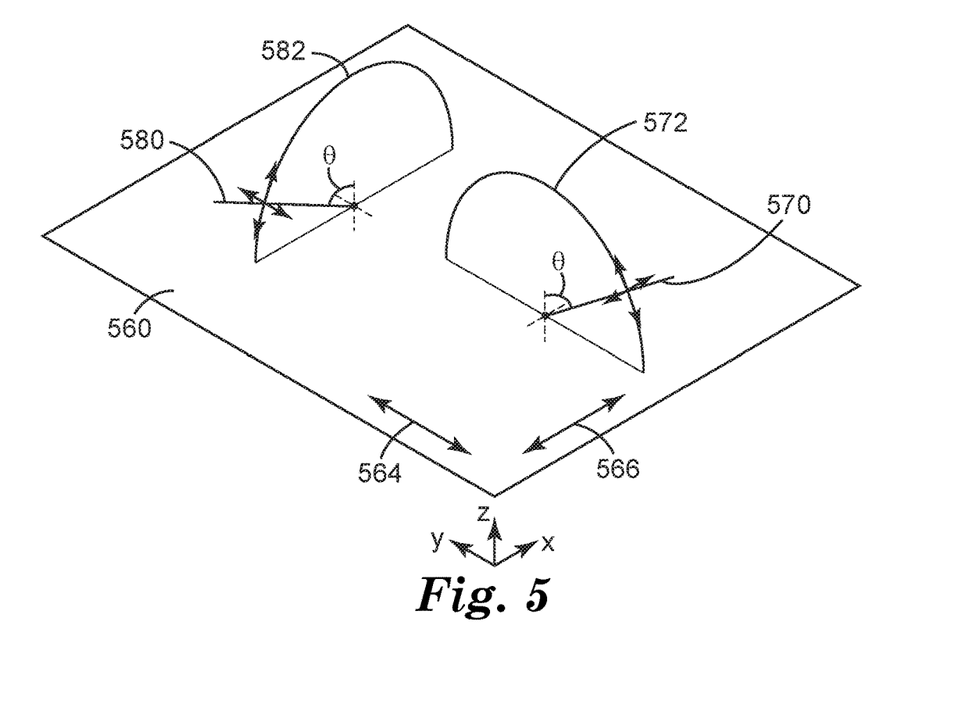
FIG. 5 is a schematic perspective view of a reflective film.

FIG. 5 is a schematic perspective view of a reflective film 560 which may be a reflective polarizer or a collimating reflector. FIG. 5 illustrates a light ray 580 that is incident on film 560 at an angle of incidence θ, thereby forming a plane of incidence 582. The film 560 includes an axis 564, which may be a pass axis, that is parallel to the y-axis, and an axis 566, which may be a block axis, that is parallel to the x-axis. The plane of incidence 582 of ray 580 is parallel to the axis 566. Ray 580 has a p-polarized component that is in the plane of incidence 582, and an s-polarized component that is orthogonal to the plane of incidence 582. In embodiments where film 560 is a reflective polarizer with pass axis 564 and block axis 566, the p-pol light of ray 580 will be, at least in part, reflected by the film 560, while the s-pol light of ray 580 is, at least in part, transmitted.

Further, FIG. 5 illustrates ray 570 that is incident on film 560 in a plane of incidence 572 that is parallel to the axis 564. In the case that film 560 is a perfect reflective polarizer that has a reflectance of 100% at all angles of incident light for light polarized in the block axis and 0% at all angles of incident light for light polarized in the pass axis, the polarizer transmits s-pol light of ray 580 and the p-pol light of ray 570, while reflecting the p-pol light of ray 580 and the s-pol light of ray 570. In other words, the film 560 will transmit a combination of p- and s-pol light. The amount of transmission and reflection of p- and s-pol light will depend on the characteristics of the film as described further elsewhere herein.

An indication of the collimating effect of a film or optical stack is the ratio of transmitted visible light at normal incidence and at a 60 degree angle of incidence. In some embodiments, film 560 is a collimating reflective polarizer having an average visible light transmittance along the pass axis at normal incidence of Tpassnormal for p-pol light and an average visible light transmittance along the pass axis at 60 degrees incidence of Tpass60 for p-pol light, and a ratio of Tpass60 to Tpassnormal is less than 0.75, or less than 0.6. In some embodiments, film 560 is a collimating reflector having an average visible light transmittance at normal incidence of Tnormal for unpolarized light and an average visible light transmittance at 60 degrees incidence of T60 for unpolarized light, and a ratio of T60 to Tnormal is less than 0.75, or less than 0.6.

In some embodiments, the first reflective polarizer is uniaxially oriented. The partially reflective component may be a second reflective polarizer and may also be uniaxially oriented. The partially reflective component may be a collimating reflector which may be uniaxially oriented, or biaxially oriented, or partially oriented to differing degrees along orthogonal first and second axes. In some embodiments, the first reflective polarizer, and optionally the second reflective polarizer, has been substantially uniaxially drawn, in that for $U=(1/MDDR-1)/(TDDR^{1/2}-1)$, U is at least 0.85, with MDDR defined as the machine direction draw ratio and TDDR defined as the transverse direction draw ratio. Such substantially uniaxially drawn reflective polarizers can be achieved utilizing a parabolic tenter as described in U.S. Pat. Appl. Pub. No. 2010/0254002 (Merrill et al.) which is hereby incorporated herein by reference to the extent that it does not contradict the present description. A suitable uniaxially drawn reflective polarizer is Advanced Polarizing Film (APF) available from 3M Company, St. Paul, Minn. For example, in some embodiments, the first reflective polarizer is APFv3 (an APF film having an f-ratio of about 0.5).

The optical stacks of the present application are useful in a variety of applications. The optical stacks are particularly useful in display applications, such as in electroluminescent displays, liquid crystal displays, and head-mounted displays.

Figure 6:
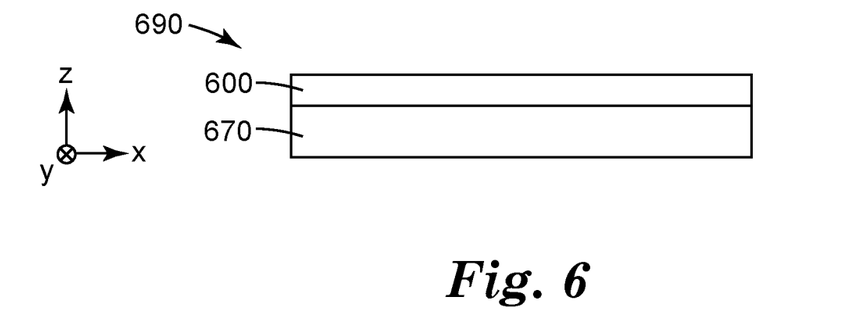
FIGS. 6-7 are schematic cross-sectional views of displays.

FIG. 6 is a schematic side view of display 690 including an optical stack 600 of the present description disposed at an output side of a display panel 670. Optical stack 600 can be used to transmit a polarized light output of the display panel 670 and to reflect a portion of light incident on the optical stack 600 external to the display. Optical stack 600 may be oriented with the first reflective polarizer facing towards or facing away from display panel 670. Display panel 670 may be an electroluminescent display panel (e.g., an organic light emitting display (OLED) panel) or a liquid crystal display (LCD) panel (a backlight (not illustrated in FIG. 6) may be included adjacent the liquid crystal display panel opposite the optical stack 600). In some embodiments, the optical stack 600 includes a quarter-wave retarder and is used as a front circular polarizer of an OLED display, for example.

Figure 7:
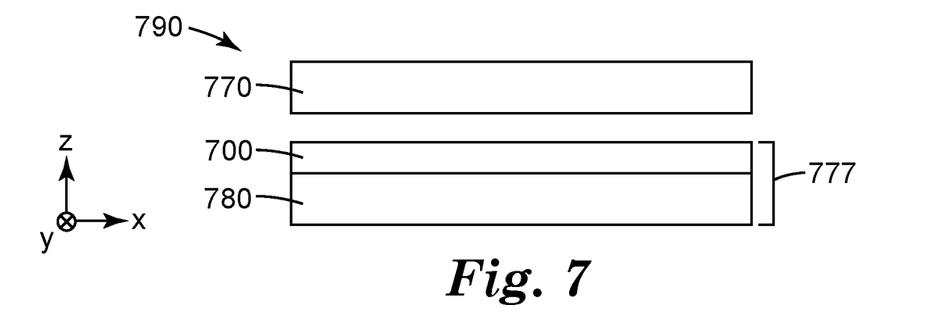

In other embodiments, an optical stack is used in a backlight of an LCD display. FIG. 7 is a schematic side view of display 790 including a liquid crystal display panel 770 and a backlight 777 disposed to illuminate the liquid crystal display panel 770. The backlight 777 includes an optical stack 700 of the present description facing the liquid crystal display panel 770 and further includes a light guide 780 adjacent the optical stack 700 opposite the liquid crystal display panel 770. It has been found that the optical stacks of the present description are useful in liquid crystal displays utilizing light recycling since the partially reflective component (e.g., second reflective polarizer or collimating reflector) can be adjusted to give desired reflective and transmissive properties of the optical stack. For example, it may be desired to lower transmission and increase reflection in order to enhance brightness and uniformity in a recycling backlight application. Such reflection properties are usefully characterized in terms of a hemispheric reflectance, Rhemi, which refers to the total reflectivity of a reflector for visible light incident on the reflector from all directions within a hemisphere centered around a normal to the reflector and assuming a Lambertian intensity distribution. Rhemi can be measured using an integrating sphere as described in U.S. Pat. No. 8,469,575 (Weber et al.) which is hereby incorporated herein by reference to the extent that it does not contradict the present description. The Rhemi value can be selected by adjusting the f-ratio and/or the orientation of the partially reflective component relative to the first reflective polarizer. For example, in embodiments where the partially reflective component is a second reflective polarizer, the angle between the pass axis of the first reflective polarizer and the pass axis of the second reflective polarizer can be adjusted to modify Rhemi. The optical stack can have any useful Rhemi which may be selected depending on the intended application. In some embodiments, the Rhemi of an optical stack is between 50 percent and 90 percent, for example.

Optical stack 700 may be oriented with the first reflective polarizer facing towards or facing away from the liquid crystal display panel 770. In some embodiments, the optical stack 700 includes a first reflective polarizer and a partially reflective component with the partially reflective component disposed between the first reflective polarizer and the light guide 780. In some embodiments, the optical stack further includes an absorbing polarizer facing the liquid crystal display panel 770.

In some embodiments, using an optical stack of the present description instead of a conventional reflective polarizer in head-mounted display allows balancing virtual image brightness and real-world brightness by suitably selecting the reflective and transmissive properties of the optical stack. As described further elsewhere herein, such reflective and transmissive properties of the optical stack can be selected by changing the f-ratio and/or orientation of the second reflective polarizer or the collimating reflector of the optical stack.

Figure 8A:
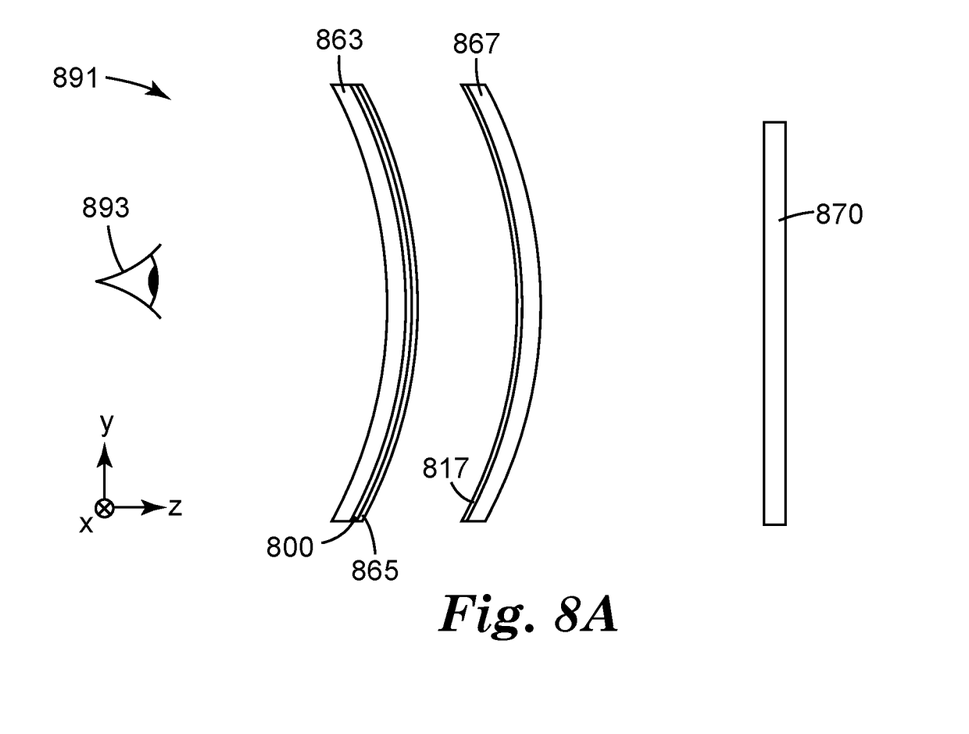
FIG. 8A is a schematic cross-section view of an optical system.
Figure 8B:
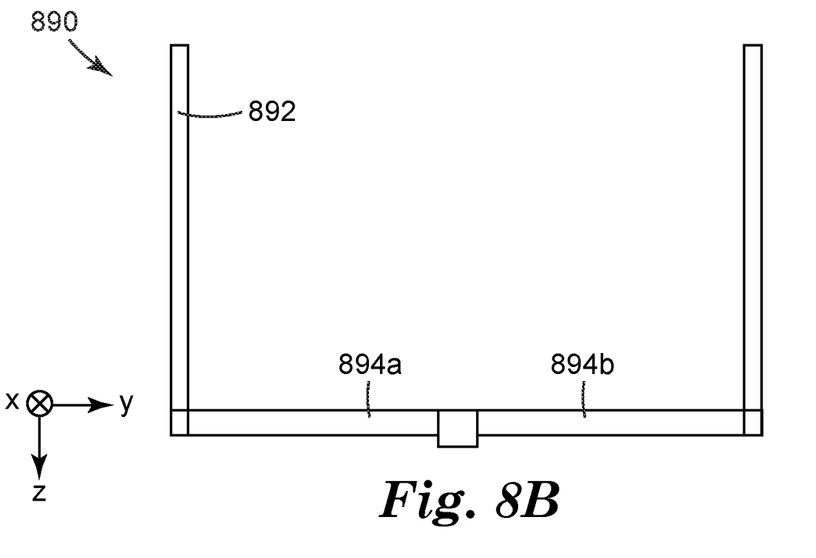
FIG. 8B is a schematic top view of a head-mounted display.

FIG. 8A is a schematic cross-sectional view of an optical system 891 of a head-mounted display 890 (illustrated in FIG. 8B) including a display panel 870 proximate to optical stack 800, and a partial reflector 817 disposed between the display panel 870 and the optical stack 800. FIG. 8B is a schematic top view of a head-mounted display 890 including a frame 892 and first and second eye portions 894a and 894b. Each of the first and second eye portions 894a and 994b may include an optical system 891. In the illustrated embodiment, the optical stack 800 is disposed on a major surface of lens 863, the partial reflector 817 is disposed on a major surface of lens 867, and a quarter-wave retarder 865 is disposed on a major surface of the optical stack 800 opposite the lens 863. The combination of the optical stack 800 and the quarter-wave retarder 865 may be considered to be an optical stack of the present description. In other embodiments, the quarter-wave retarder 865 is disposed on a separate substrate disposed between the lens 863 and the lens 867. In some embodiments, the partial reflector 817 is disposed on the major surface of the lens 867 opposite to the major surface illustrated in FIG. 8A. In some embodiments, the optical stack 800 is disposed on the major surface of the lens 863 opposite to the major surface illustrated in FIG. 8A. In still other embodiments, a single lens is used with the optical stack 800 and the partial reflector 817 disposed on opposite sides of the lens. The optical stack 800 may be disposed with the first polarizer facing towards or away from the display panel 870. In some embodiments, the partial reflector 817 has an average visible reflectance (unweighted average of unpolarized light at normal incidence over the visible wavelength range of 400 nm to 700 nm) in a range of 30 percent to 70 percent. The partial reflector 817 can be a partially metalized film, for example. The optical system 891 is adapted to provide an image from the display panel 870 to an eye 893 of a viewer.

Any of the optical stacks 600, 700, or 800 may correspond to any of the other optical stacks described elsewhere herein (e.g., optical stacks 100 or 200). Each of the optical stacks 600, 700, or 800 includes a first reflective polarizer and an additional partially reflective component which may be a second reflective polarizer or a collimating reflector. Any of the optical stacks 600, 700, or 800 may further include an absorbing polarizer as described further elsewhere herein. The layers of the optical stacks 600, 700, or 800 may be oriented any either direction. In some embodiments, the first reflective polarizer of the optical stacks 600, 700, or 800 may be oriented to face an output direction of the display; while in other embodiments the partially reflective component of the optical stacks 600, 700, or 800 may be oriented to face an output direction of the display.

The following is a list of exemplary embodiments of the present description.

Embodiment 1 is an optical stack, comprising:
a first reflective polarizer having a first pass axis and an orthogonal first block axis and comprising a first plurality of alternating polymeric layers having a first f-ratio, the first reflective polarizer having a first average visible light reflectance for light polarized along the first block axis at normal incidence of at least 90 percent and a first average visible light transmittance for light polarized along the first pass axis at normal incidence of at least 85 percent; and
a second reflective polarizer proximate the first reflective polarizer, the second reflective polarizer having a second pass axis and an orthogonal second block axis and comprising a second plurality of alternating polymeric layers having a second f-ratio, the second reflective polarizer having a second average visible light reflectance for light polarized along the second block axis at normal incidence, the second average visible light reflectance being no more than the first average visible light reflectance minus 10 percent, wherein the second f-ratio is different from the first f-ratio and the second pass axis is not parallel to the first pass axis.

Embodiment 2 is the optical stack of Embodiment 1, wherein an angle between the first and second pass axes is in a range of 10 to 90 degrees.

Embodiment 3 is the optical stack of Embodiment 2, wherein the angle is in a range of 45 to 90 degrees.

Embodiment 4 is the optical stack of Embodiment 3, wherein the angle is in a range of 60 to 90 degrees.

Embodiment 5 is the optical stack of Embodiment 4, wherein the angle is in a range of 80 to 90 degrees.

Embodiment 6 is the optical stack of Embodiment 1, wherein the first f-ratio is in a range of 0.4 to 0.6 and the second f-ratio is less than 0.2 or greater than 0.8.

Embodiment 7 is the optical stack of Embodiment 1, wherein the first f-ratio is in a range of 0.45 to 0.55 and the second f-ratio is less than 0.15 or greater than 0.85.

Embodiment 8 is the optical stack of Embodiment 1, wherein the second reflective polarizer is a collimating reflective polarizer.

Embodiment 9 is the optical stack of Embodiment 8, wherein the collimating reflective polarizer has an average visible light transmittance along the second pass axis at normal incidence of Tpassnormal for p-pol light and an average visible light transmittance along the second pass axis at 60 degrees incidence of Tpass60 for p-pol light, and a ratio of Tpass60 to Tpassnormal is less than 0.75.

Embodiment 10 is the optical stack of Embodiment 1, wherein the second average visible light reflectance is no more than the first average visible light reflectance minus 20 percent.

Embodiment 11 is the optical stack of Embodiment 1, wherein the second average visible light reflectance is no more than the first average visible light reflectance minus 30 percent.

Embodiment 12 is the optical stack of Embodiment 1, wherein the second average visible light reflectance is no more than 50 percent.

Embodiment 13 is the optical stack of Embodiment 1, wherein the second reflective polarizer has a second average visible light transmittance of at least 85 percent for light polarized along the second pass axis at normal incidence.

Embodiment 14 is the optical stack of Embodiment 1, wherein the first and second reflective polarizers are attached to each other through an optically clear adhesive.

Embodiment 15 is the optical stack of Embodiment 1, further comprising an absorbing polarizer having a third pass axis aligned with the first pass axis, the absorbing polarizer attached to the first polarizer opposite the second polarizer.

Embodiment 16 is the optical stack of Embodiment 1, wherein the first reflective polarizer has been substantially uniaxially drawn, in that for $U=(1/MDDR-1)/(TDDR^{1/2}-1)$, U is at least 0.85, with MDDR defined as the machine direction draw ratio and TDDR defined as the transverse direction draw ratio.

Embodiment 17 is an optical stack, comprising:
a first reflective polarizer having a first pass axis and an orthogonal first block axis and comprising a first plurality of alternating polymeric layers having a first f-ratio, the first reflective polarizer having a first average visible light reflectance for light polarized along the first block axis at normal incidence of at least 90 percent and a first average visible light transmittance for light polarized along the first pass axis at normal incidence of at least 85 percent; and
a collimating reflector proximate the first reflective polarizer and comprising a second plurality of alternating polymeric layers, the collimating reflector having a second average visible reflectance for unpolarized light at normal incidence in a range of 20 percent to 80 percent.

Embodiment 18 is the optical stack of Embodiment 17, wherein the collimating reflector has an average visible light transmittance at normal incidence of Tnormal for unpolarized light and an average visible light transmittance at 60 degrees incidence of T60 for unpolarized light, and a ratio of T60 to Tnormal is less than 0.75.

Embodiment 19 is the optical stack of Embodiment 17, wherein the collimating reflector is an asymmetric reflector.

Embodiment 20 is the optical stack of Embodiment 19, wherein the asymmetric reflector is a second reflective polarizer having a second pass axis and an orthogonal second block axis, the second pass axis not being parallel to the first pass axis.

Embodiment 21 is the optical stack of Embodiment 20, wherein the collimating reflector has an average visible light transmittance along the second pass axis at normal incidence of Tpassnormal for p-pol light and an average visible light transmittance along the second pass axis at 60 degrees incidence of Tpass60 for p-pol light, and a ratio of Tpass60 to Tpassnormal is less than 0.75.

Embodiment 22 is the optical stack of Embodiment 20, wherein an angle between the first and second pass axes is in a range of 10 to 90 degrees.

Embodiment 23 is the optical stack of Embodiment 20, wherein the first f-ratio is in a range of 0.4 to 0.6 and the second plurality of alternating polymeric layers have a second f-ratio less than 0.2 or greater than 0.8.

Embodiment 24 is the optical stack of Embodiment 17, wherein the first f-ratio is in a range of 0.4 to 0.6.

Embodiment 25 is the optical stack of Embodiment 17, wherein the second average visible light reflectance is no more than the first average visible light reflectance minus 20 percent.

Embodiment 26 is the optical stack of Embodiment 17, wherein the second average visible light reflectance is no more than the first average visible light reflectance minus 30 percent.

Embodiment 27 is the optical stack of Embodiment 17, wherein the first reflective polarizer is uniaxially oriented and the collimating reflector is biaxially oriented.

Embodiment 28 is the optical stack of Embodiment 17, further comprising an absorbing polarizer having a third pass axis aligned with the first pass axis, the absorbing polarizer attached to the first polarizer opposite the collimating reflector.

Embodiment 29 is the optical stack of Embodiment 17, wherein the first reflective polarizer has been substantially uniaxially drawn, in that for $U=(1/MDDR-1)/(TDDR^{1/2}-1)$, U is at least 0.85, with MDDR defined as the machine direction draw ratio and TDDR defined as the transverse direction draw ratio.

Embodiment 30 is a display comprising the optical stack of any one of Embodiments 1 to 29.

Embodiment 31 is the display of Embodiment 30 comprising a liquid crystal display panel and a backlight disposed to illuminate the liquid crystal display panel, wherein the backlight comprises the optical stack, the optical stack facing the liquid crystal display panel.

Embodiment 32 is the display of Embodiment 30 being an electroluminescent display.

Embodiment 33 is the display of Embodiment 30 being a head-mounted display.

Embodiment 34 is the display of Embodiment 33, wherein the head-mounted display comprises a display panel proximate to the optical stack, and a partial reflector disposed between the display panel and the optical stack, the partial reflector having an average normal incidence visible reflectance in a range of 30 percent to 70 percent.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical stack, comprising:
   a first reflective polarizer having a first pass axis and an orthogonal first block axis and comprising a first plurality of alternating polymeric layers having a first f-ratio, the first reflective polarizer having a first average visible light reflectance for light polarized along the first block axis at normal incidence of at least 90 percent and a first average visible light transmittance for light polarized along the first pass axis at normal incidence of at least 85 percent; and
   a second reflective polarizer proximate the first reflective polarizer, the second reflective polarizer having a second pass axis and an orthogonal second block axis and comprising a second plurality of alternating polymeric layers having a second f-ratio, the second reflective polarizer having a second average visible light reflectance for light polarized along the second block axis at normal incidence, the second average visible light reflectance being no more than the first average visible light reflectance minus 10 percent,
   wherein the second f-ratio is different from the first f-ratio and the second pass axis is not parallel to the first pass axis.

2. The optical stack of claim 1, wherein an angle between the first and second pass axes is in a range of 10 to 90 degrees.

3. The optical stack of claim 1, wherein the first f-ratio is in a range of 0.4 to 0.6 and the second f-ratio is less than 0.2 or greater than 0.8.

4. The optical stack of claim 1, wherein the second reflective polarizer is a collimating reflective polarizer.

5. The optical stack of claim 4, wherein the collimating reflective polarizer has an average visible light transmittance along the second pass axis at normal incidence of Tpassnormal for p-pol light and an average visible light transmittance along the second pass axis at 60 degrees incidence of Tpass60 for p-pol light, and a ratio of Tpass60 to Tpassnormal is less than 0.75.

6. The optical stack of claim 1, wherein the second average visible light reflectance is no more than the first average visible light reflectance minus 20 percent.

7. The optical stack of claim 1, wherein the second average visible light reflectance is no more than 50 percent.

8. The optical stack of claim 1, further comprising an absorbing polarizer having a third pass axis aligned with the first pass axis, the absorbing polarizer attached to the first reflective polarizer opposite the second reflective polarizer.

9. The optical stack of claim 1, wherein the first reflective polarizer has been substantially uniaxially drawn, in that for $U=(1/MDDR-1)/(TDDR^{1/2}-1)$, U is at least 0.85, with MDDR defined as the machine direction draw ratio and TDDR defined as the transverse direction draw ratio.

10. A display comprising the optical stack of claim 1.

11. An optical stack, comprising:
    a first reflective polarizer having a first pass axis and an orthogonal first block axis and comprising a first plurality of alternating polymeric layers having a first f-ratio, the first reflective polarizer having a first average visible light reflectance for light polarized along the first block axis at normal incidence of at least 90 percent and a first average visible light transmittance for light polarized along the first pass axis at normal incidence of at least 85 percent; and
    a collimating reflector proximate the first reflective polarizer and comprising a second plurality of alternating polymeric layers, the collimating reflector having a second average visible light reflectance for unpolarized light at normal incidence in a range of 20 percent to 80 percent.

12. The optical stack of claim 11, wherein the collimating reflector has an average visible light transmittance at normal incidence of Tnormal for unpolarized light and an average visible light transmittance at 60 degrees incidence of T60 for unpolarized light, and a ratio of T60 to Tnormal is less than 0.75.

13. The optical stack of claim 11, wherein the collimating reflector is an asymmetric reflector.

14. The optical stack of claim 13, wherein the asymmetric reflector is a second reflective polarizer having a second pass axis and an orthogonal second block axis, the second pass axis not being parallel to the first pass axis.

15. The optical stack of claim 14, wherein the collimating reflector has an average visible light transmittance along the second pass axis at normal incidence of Tpassnormal for p-pol light and an average visible light transmittance along the second pass axis at 60 degrees incidence of Tpass60 for p-pol light, and a ratio of Tpass60 to Tpassnormal is less than 0.75.

16. The optical stack of claim 14, wherein an angle between the first and second pass axes is in a range of 10 to 90 degrees.

17. The optical stack of claim 11, wherein the second average visible light reflectance is no more than the first average visible light reflectance minus 20 percent.

18. The optical stack of claim 11, wherein the first reflective polarizer is uniaxially oriented and the collimating reflector is biaxially oriented.

19. The optical stack of claim 11, further comprising an absorbing polarizer having a third pass axis aligned with the first pass axis, the absorbing polarizer attached to the first polarizer opposite the collimating reflector.

20. The optical stack of claim 11, wherein the first reflective polarizer has been substantially uniaxially drawn, in that for $U=(1/MDDR-1)/(TDDR^{1/2}-1)$, U is at least 0.85, with MDDR defined as the machine direction draw ratio and TDDR defined as the transverse direction draw ratio.

* * * * *